US012058585B2

(12) United States Patent
Raj et al.

(10) Patent No.: US 12,058,585 B2
(45) Date of Patent: *Aug. 6, 2024

(54) INDOOR MAP GENERATION USING RADIO FREQUENCY SENSING

(71) Applicant: QUALCOMM Incorporated, San Diego, CA (US)

(72) Inventors: Rishabh Raj, Jamshedpur (IN); Xiaoxin Zhang, Sunnyvale, CA (US); Parthiban Ellappan, Virudhunagar (IN); Shree Raman Srinivasan, San Jose, CA (US); Ravindra Chauhan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,744

(22) Filed: May 31, 2023

(65) Prior Publication Data
US 2023/0319504 A1 Oct. 5, 2023

Related U.S. Application Data

(63) Continuation of application No. 17/229,794, filed on Apr. 13, 2021, now Pat. No. 11,743,682.

(51) Int. Cl.
H04W 4/02 (2018.01)
H04W 4/80 (2018.01)
(Continued)

(52) U.S. Cl.
CPC .......... *H04W 4/023* (2013.01); *H04W 4/025* (2013.01); *H04W 4/80* (2018.02); *H04W 72/54* (2023.01); *H04W 80/06* (2013.01); *H04W 84/18* (2013.01)

(58) Field of Classification Search
CPC ....... H04W 4/023; H04W 4/025; H04W 4/80; H04W 72/08; H04W 80/06; H04W 84/18
See application file for complete search history.

(56) References Cited

U.S. PATENT DOCUMENTS 10,732,254 B2    8/2020  Chiu et al.
11,743,682 B2 *  8/2023  Raj .................. H04W 4/025
                                                 370/338
(Continued)

FOREIGN PATENT DOCUMENTS

WO    2017180698 A1    10/2017
WO    2020223689 A1    11/2020

OTHER PUBLICATIONS

International Search Report and Written Opinion—PCT/US2022/020419—ISA/EPO—Sep. 19, 2022.
(Continued)

*Primary Examiner* — Abdullahi Ahmed
(74) *Attorney, Agent, or Firm* — QUALCOMM Incorporated

(57) ABSTRACT

Disclosed are systems and techniques for performing mapping using radio frequency (RF) sensing. For instance, a server can obtain a first set of RF sensing data and orientation data corresponding to a first wireless device from a plurality of wireless devices. The first set of RF sensing data can be associated with at least one received waveform that is a reflection of a transmitted waveform from a first reflector. Based on the first set of RF sensing data, orientation data, and location data corresponding to the first wireless device, an indoor map can be generated that includes a reference to the reflector.

30 Claims, 8 Drawing Sheets

(51) Int. Cl.
  *H04W 72/54* (2023.01)
  *H04W 80/06* (2009.01)
  *H04W 84/18* (2009.01)

(56) References Cited

U.S. PATENT DOCUMENTS

| | | | |
|---|---|---|---|
| 2016/0054440 A1 | 2/2016 | Younis | |
| 2017/0131398 A1* | 5/2017 | Younis | G01S 13/758 |
| 2018/0196972 A1* | 7/2018 | Lu | H04W 52/0274 |
| 2019/0162542 A1 | 5/2019 | Zu et al. | |
| 2019/0320409 A1* | 10/2019 | Dvorecki | G01S 19/396 |
| 2022/0045554 A1* | 2/2022 | Leabman | A61B 8/56 |
| 2022/0050162 A1* | 2/2022 | Zand | H04W 4/026 |
| 2022/0283296 A1* | 9/2022 | Zhang | G01S 13/867 |
| 2022/0329968 A1 | 10/2022 | Raj et al. | |

OTHER PUBLICATIONS

Khan U.M., et al., "RFMap: Generating Indoor Maps using RF Signals", 2020 19th ACM/IEEE International Conference on Information Processing in Sensor Networks (IPSN), IEEE, Apr. 2020, pp. 133-144.
Lu C X., et al., "See Through Smoke: Robust Indoor Mapping with Low-cost mmWave Radar", Arxiv.org, Cornell University Library, 201 Olin Library Cornell University Ithaca, NY 14853, Nov. 1, 2019, 14 Pages, XP081659213, Abstract, Sections 5, 7.4, 7.6 and 8 "RF-Based Imagining and Tracking", figures 1,3,7.
Ma Y., et al., "WiFi Sensing with Channel State Information: A Survey", ACM Computer Survey, vol. 52, No. 3, Article 46, Jun. 2019, p. 46.1-46.36.
Zayets A., et al., "3D Reconstruction of Indoor Geometry using Electromagnetic Multipath Fingerprints", IEEE, ICC 2019—2019 IEEE International Conference on Communications (ICC), May 2019, 7 Pages.

* cited by examiner

INDOOR MAP GENERATION USING RADIO FREQUENCY SENSING

CROSS-REFERENCE TO RELATED APPLICATIONS

This application is a continuation of U.S. Non-Provisional application Ser. No. 17/229,794, filed Apr. 13, 2021, which is hereby incorporated by reference in its entirety and for all purposes.

FIELD OF THE DISCLOSURE

The present disclosure generally relates to indoor mapping. Aspects of the disclosure relate to systems and techniques for using radio frequency (RF) sensing to generate indoor maps.

BACKGROUND OF THE DISCLOSURE

Wireless electronic devices are capable of providing various telecommunications services as well as geolocation, mapping, and route-finding functions. For example, portable electronic devices can include software and hardware components that can determine the device's location and provide a user with directions to a particular destination.

In order to implement various telecommunications functions, wireless electronic devices can include hardware and software components that are configured to transmit and receive radio frequency (RF) signals. For example, a mobile device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for generating indoor maps. According to at least one example, a method is provided for generating an indoor map. The method can include: receiving, by a server device, a first set of radio frequency (RF) sensing data and orientation data corresponding to a first wireless device from a plurality of wireless devices, wherein the first set of RF sensing data is associated with at least one received waveform that is a reflection of a transmitted waveform off of a first reflector; and generating, by the server device, an indoor map that includes a reference to the first reflector based on the first set of RF sensing data, the orientation data, and location data corresponding to the first wireless device.

In another example, an apparatus for indoor mapping is provided that includes a memory and at least one processor (e.g., configured in circuitry) coupled to the memory. The at least one processor is configured to: receive a first set of radio frequency (RF) sensing data and orientation data corresponding to a first wireless device from a plurality of wireless devices, wherein the first set of RF sensing data is associated with at least one received waveform that is a reflection of a transmitted waveform off of a first reflector; and generate an indoor map that includes a reference to the first reflector based on the first set of RF sensing data, the orientation data, and location data corresponding to the first wireless device.

In another example, a non-transitory computer-readable medium is provided that includes stored thereon at least one instruction that, when executed by one or more processors, cause the one or more processors to: receive a first set of radio frequency (RF) sensing data and orientation data corresponding to a first wireless device from a plurality of wireless devices, wherein the first set of RF sensing data is associated with at least one received waveform that is a reflection of a transmitted waveform off of a first reflector; and generate an indoor map that includes a reference to the first reflector based on the first set of RF sensing data, the orientation data, and location data corresponding to the first wireless device.

In another example, an apparatus for performing indoor mapping is provided. The apparatus includes: means for receiving a first set of radio frequency (RF) sensing data and orientation data corresponding to a first wireless device from a plurality of wireless devices, wherein the first set of RF sensing data is associated with at least one received waveform that is a reflection of a transmitted waveform off of a first reflector; and means for generating an indoor map that includes a reference to the first reflector based on the first set of RF sensing data, the orientation data, and location data corresponding to the first wireless device.

In another example, a method for performing indoor mapping is provided. The method includes: transmitting, by a wireless device, a radio frequency (RF) signal; receiving, by the wireless device, a plurality of reflected RF signals that are each a reflection of the transmitted RF signal from at least one object in an indoor space; obtaining, by the wireless device, RF sensing data for the plurality of reflected RF signals from the at least one object; and presenting, by the wireless device, the indoor map for the indoor space that includes a reference to the at least one object, wherein the reference to the at least one object is based on the RF sensing data.

In another example, an apparatus for indoor mapping is provided that includes a transceiver, a memory and at least one processor (e.g., configured in circuitry) coupled to the memory and the transceiver. The at least one processor is configured to: transmit, via the transceiver, a radio frequency (RF) signal; receive, via the transceiver, a plurality of reflected RF signals that are each a reflection of the transmitted RF signal from at least one object in an indoor space; obtain RF sensing data for the plurality of reflected RF signals from the at least one object; and present the indoor map for an indoor space that includes a reference to the at least one object, wherein the reference to the at least one object is based on the RF sensing data.

In another example, a non-transitory computer-readable medium is provided that includes stored thereon at least one instruction that, when executed by one or more processors, cause the one or more processors to: transmit a radio frequency (RF) signal; receive a plurality of reflected RF signals that are each a reflection of the transmitted RF signal from at least one object in an indoor space; obtain RF sensing data for the plurality of reflected RF signals from the at least one object; and present the indoor map for an indoor space that includes a reference to the at least one object, wherein the reference to the at least one object is based on the RF sensing data.

In another example, an apparatus for performing indoor mapping is provided. The apparatus includes: means for transmitting a radio frequency (RF) signal; means for receiving a plurality of reflected RF signals that are each a reflection of the transmitted RF signal from at least one object in an indoor space; means for obtaining RF sensing data for the plurality of reflected RF signals from the at least one object; and means for presenting the indoor map for the indoor space that includes a reference to the at least one object, wherein the reference to the at least one object is based on the RF sensing data.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a tablet, a personal computer, a laptop computer, a server computer, a wireless access point, or other any other device having an RF interface. In some aspects, the apparatuses described above can include one or more sensors, which can be used for determining a location of the apparatuses, an orientation of the apparatuses, and/or for any other purpose.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
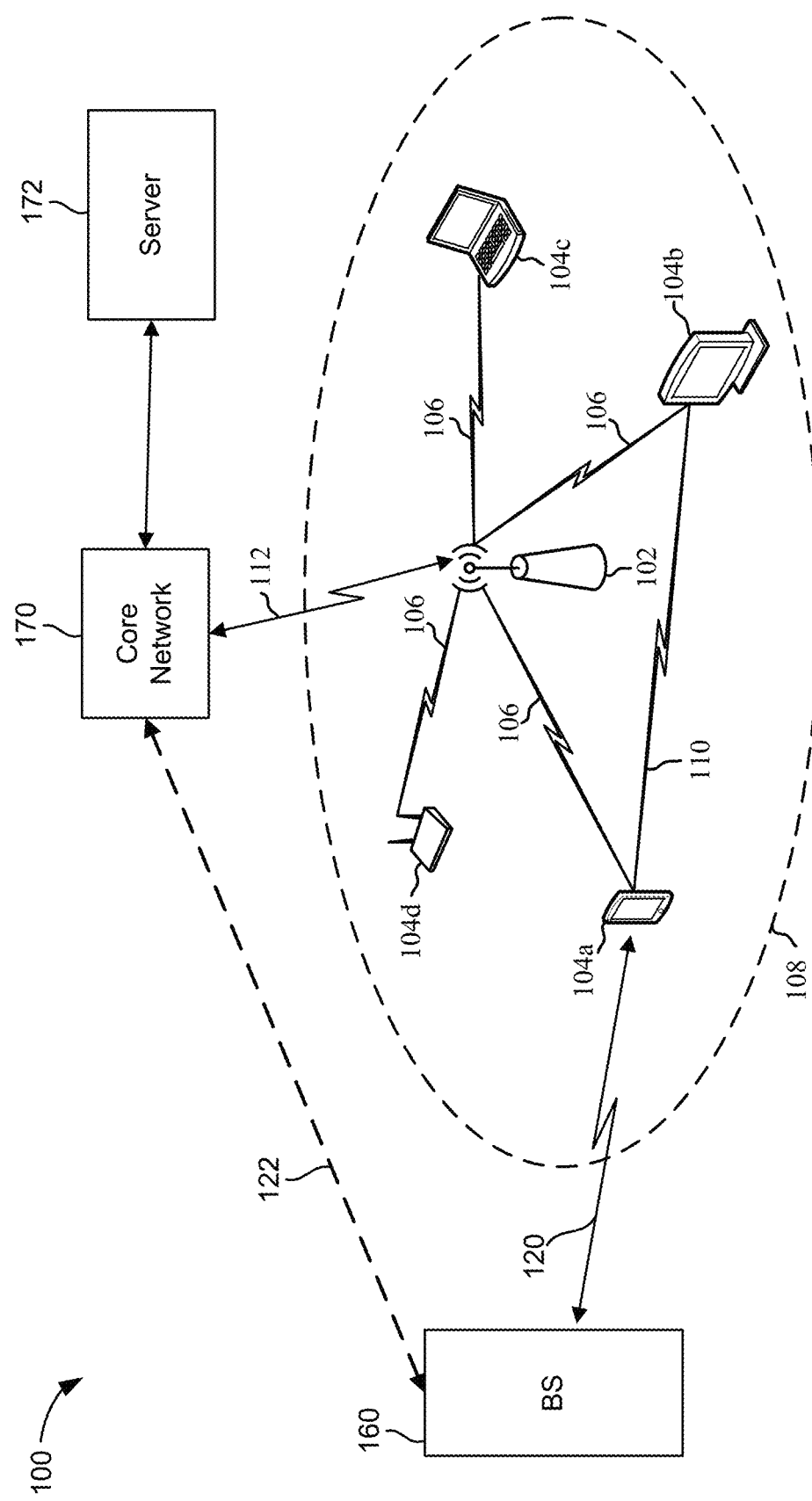
FIG. 1 illustrates an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Portable electronic devices, such as smartphones, tablets, or laptops, are capable of performing functions that can include geolocation, mapping, and route-finding features. Typically, these portable electronic devices include hardware and software components that utilize the Global Navigation Satellite System (GNSS), such as the Global Positioning System (GPS), to determine the device's location. While such systems provide a high degree of accuracy for the device's position, a direct line of sight between the device and GNSS satellites is required to ensure proper functionality. As such, these systems are not suitable for indoor use and can be limited for some outdoor use cases.

To overcome the shortcomings associated with GNSS, techniques have been developed to facilitate mapping of indoor environments by utilizing alternative mechanisms for tracking a device location and/or device trajectory. For example, systems are available that utilize a beacon to track the position of a device, such as a robotic vacuum cleaner, throughout an indoor space. By aggregating the position data, a map can be generated that is based on the locations that are accessible to the device. The system may then assume that certain locations from which the device has not reported are inaccessible due to the presence of a wall or furniture, for example.

Techniques also exist that can track the trajectory of a mobile device throughout an indoor space by monitoring the device location at regular time intervals. For example, location information associated with the device location and time stamp data can be utilized to map device movement or trajectory. The accumulated device trajectory data can be used to generate a map of the indoor environment.

While these techniques may be used to render a rudimentary two-dimensional map of an indoor space, they are not capable of generating a three-dimensional map. Moreover, as noted above, existing indoor map generation techniques rely solely on the mobile device's location or trajectory, and then use this information to make inferences about the surrounding spaces. The existing techniques do not directly capture any data regarding the environment that surrounds the devices, such as walls, floors, ceilings, doors, and furniture, among others.

Furthermore, reliance on device position to generate an indoor map is time-consuming, as it requires the device or a user carrying the device to cover large amounts of space. Also, reliance on location data is inherently flawed as there may be some spaces that are accessible but not regularly frequented. Consequently, the resulting indoor map can include a high level of inaccuracy with respect to the objects in the indoor space as well as the overall layout.

Systems, apparatuses, processes (also referred to as methods), and computer-readable media (collectively referred to as "systems and techniques") are described herein for generating a map, such as a map of an indoor space (an indoor map), a map of an outdoor space (an outdoor map), a map of a space that includes indoors and outdoors, another type of map, or any combination thereof. Examples will be described herein using indoor maps as an example. However, the systems and techniques are not limited to generating indoor maps, but can be used to generate any type of map. The systems and techniques provide the ability for an electronic device to perform radio frequency (RF) sensing and obtain RF sensing data that can be used to generate a map of a space (e.g., an indoor space). The RF sensing data can be obtained by utilizing wireless interfaces that are capable of simultaneously performing transmit and receive functions. Examples will be described below using Wi-Fi as an illustrative example. However, the systems and techniques are not limited to Wi-Fi. For example, in some cases, the systems and techniques can be implemented using 5G/New Radio (NR), such as using millimeter wave (mmWave) technology. In some cases, the systems and techniques can be implemented using other wireless technologies, such as Bluetooth™, ultra-wideband (UWB), among others.

In some examples, the systems and techniques can perform RF sensing by implementing a device's Wi-Fi interface having at least two antennas that can be used to simultaneously transmit and receive an RF signal. In some instances, the antennas can be omnidirectional such that RF signals can be received from and transmitted in all directions. For example, a device may utilize a transmitter of its Wi-Fi interface to transmit an RF signal and simultaneously enable a Wi-Fi receiver of the Wi-Fi interface so that the device may capture any signals that reflect from reflectors (e.g., static or dynamic objects and/or structural elements) in the surrounding environment. The Wi-Fi receiver can also receive leakage signals that are coupled directly from the Wi-Fi transmitter's antenna to the Wi-Fi receiver's antenna without reflecting from any objects. In doing so, the device may gather RF sensing data in the form of channel state information (CSI) based on data relating to the direct paths (leakage signals) of the transmitted signal together with data relating to the reflected paths of the signals received that correspond to the transmitted signal.

In some aspects, the CSI data can be used to calculate the distance of the reflected signals as well as the angle of arrival. The distance and angle of the reflected signals can be used to identify the size and position of reflectors in the surrounding environment in order to generate an indoor map.

In some examples, the distance of the reflected signals and the angle of arrival can be determined using signal processing, machine learning algorithms, using any other suitable technique, or any combination thereof. In one example, the distance of the reflected signals can be calculated by measuring the difference in time from reception of the leakage signal to the reception of the reflected signals. In another example, the angle of arrival can be calculated by utilizing an antenna array to receive the reflected signals and measuring the difference in received phase at each element of the antenna array.

In some aspects, the distance of the reflected signals together with the angle of arrival of the reflected signals can be used to determine the size and shape of the objects causing the reflections. For example, the device can utilize the calculated distance and angle of arrival to determine the point at which the signal reflected from an object. The device can then aggregate the reflection points for various signals to determine the size and shape of the reflector.

In some cases, the device may determine and store device position data and device orientation data. In some instances, the device position data and device orientation data can be used to adjust the calculations for the distance and angle of arrival of the reflected signals (determined using the CSI data) if the device is in motion. For example, the position and orientation data can be used to correlate one or more reflected signals with their corresponding transmitted signal. In some examples, device position or location data can be gathered using techniques that measure round trip time (RTT), Passive Positioning, Angle of Arrival (AoA), Received Signal Strength Indicator (RSSI), using the CSI data, using any other suitable technique, or any combination thereof. The device orientation data can be obtained from electronic sensors on the device, such as by using one or more gyroscope/s, accelerometer/s, compass(es), any other suitable sensor, or any combination thereof.

In some examples, the device itself may analyze the RF sensing data (e.g., CSI data) and perform the reflected distance and angle calculations in order to identify objects/boundaries in its surrounding environment. The device may use this data to generate its own local indoor map. In some cases, the device may then upload its map information to a server that can obtain map information from multiple devices. The server may aggregate map data it obtains from multiple devices to further develop the indoor map. In some examples, the server may then provide updated map information to the devices.

In some examples, the device may upload the RF sensing data to a server. In some cases, the device may also send its location and orientation data to the server along with the RF sensing data. The server may perform the calculations to determine distances and angles of arrival of reflected signals, which can relieve the device of the computational overhead required to perform the calculations. Based on the determined distances and angles of arrival, the server may generate the indoor map and provide the indoor map to the device.

In some instances, the server may perform "crowd-sourcing" of data from numerous devices to develop a more detailed indoor map. Devices that provide data to the server may or may not be associated with local networks (e.g., Wi-Fi networks) that are present in their respective indoor environment. For example, the server may receive data from devices that are located inside of buildings that offer local Wi-Fi irrespective of the device's association with the local network. In some examples, a wireless device may utilize an RF interface such as its Wi-Fi transceiver to gather CSI data when it is not connected to a Wi-Fi router or Wi-Fi access point in a building. Similarly, a wireless device may utilize an RF interface to gather RF sensing data when there are no networks available in the indoor environment. The device may store the RF sensing data locally and send it to the server at a later time when a network connection becomes available.

In some techniques, a device may provide the server with or otherwise utilize an absolute location. For example, although a device is located inside of a building, the proximity of the device to an exterior wall or window may permit the device to acquire a GPS fix, which will permit the device to identify its absolute location. Alternatively, the device may utilize its last known GPS location, which can be used to estimate a location of the building in which the GPS fix was terminated. In the case where an absolute location is known or estimated, the absolute location can be used to associate the interior map with a particular building. Alternatively, the device may utilize a relative location. For example, the location data may be relative to a Wi-Fi access point or a Bluetooth™ beacon located inside the same environment as the device.

Various aspects of the techniques described herein will be discussed below with respect to the figures. FIG. 1 is a block diagram of an example communication network 100. According to some aspects, the communication network 100 can include a wireless local area network (WLAN) such as a Wi-Fi network 108 (and will hereinafter be referred to as WLAN 108). For example, the WLAN 108 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

WLAN 108 may include numerous wireless communication devices such as an access point (AP) 102 and user equipment (UEs) 104a, 104b, 104c, and 104d (collectively "UEs 104"). While only one AP 102 is shown, the WLAN 108 also can include multiple APs 102. In general, a UE may be any wireless communication device (e.g., a mobile phone, router, tablet computer, laptop computer, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof. Generally, UEs can communicate with a core network via a RAN, and through the core network the UEs can be connected with external networks such as the Internet and with other UEs. UEs can also communicate with other UEs and/or other devices as described herein.

A single AP 102 and an associated set of UEs 104 may be referred to as a basic service set (BSS), which is managed by the respective AP 102. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any UEs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various UEs 104 in the WLAN via respective communication links 106.

To establish a communication link 106 with an AP 102, each of the UEs 104 is configured to perform passive or active scanning operations ("scans") on frequency channels in one or more frequency bands (for example, the 2.4 GHz, 5 GHz, 6 GHz or 60 GHz bands). To perform passive scanning, UEs 104 listen for beacons, which are transmitted by respective APs 102 at a periodic time interval referred to as the target beacon transmission time (TBTT) (measured in time units (TUs) where one TU may be equal to 1024 microseconds (μs)). To perform active scanning, UEs 104 generate and sequentially transmit probe requests on each channel to be scanned and listens for probe responses from APs 102. Each UE 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the UEs 104 at the culmination of the association operations, which the AP 102 uses to track UEs 104.

As a result of the increasing ubiquity of wireless networks, UEs 104 may have the opportunity to select one of many BSSs within range of the UE or to select among multiple APs 102 that together form an extended service set (ESS) including multiple connected BSSs. An extended network station associated with the WLAN 108 may be connected to a wired or wireless distribution system that may allow multiple APs 102 to be connected in such an ESS. As such, a UE 104 can be covered by more than one AP 102 and can associate with different APs 102 at different times for different transmissions. Additionally, after association with an AP 102, a UE 104 also may be configured to periodically scan its surroundings to find a more suitable AP 102 with which to associate. For example, a UE 104 that is moving relative to its associated AP 102 may perform a "roaming" scan to find another AP 102 having more desirable network characteristics such as a greater received signal strength indicator (RSSI) or a reduced traffic load.

In some cases, UEs 104 may form networks without APs 102 or other equipment other than the UEs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 108. In such implementations, while the UEs 104 may be capable of communicating with each other through the AP 102 using communication links 106, UEs 104 also can communicate directly with each other via direct wireless links 110. Additionally, two UEs 104 may communicate via one or more device-to-device (D2D) peer-to-peer (P2P) links referred to as "sidelinks." In the example of FIG. 1, UE 104b has a direct wireless link 110 (e.g., a D2D P2P link) with UE 104a, which is connected to one or more base stations 160 and permits UE 104b to indirectly obtain cellular connectivity. While a single base station 160 is illustrated in FIG. 1, the communication system 100 can include multiple base stations in communication with the UEs 104. In an example, the direct wireless link 110 may be supported with any well-known D2D radio access technology (RAT), such as LTE Direct (LTE-D), Wi-Fi Direct (WiFi-D), Bluetooth®, UWB, and so on.

The APs 102 and UEs 104 may function and communicate (via the respective communication links 106) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and UEs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and UEs 104 in the WLAN 108 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and UEs 104 described herein also may communicate in other frequency bands, such as the 6 GHz band, which may support both licensed and unlicensed communications. The APs 102 and UEs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz or 200 MHz by bonding together multiple 20 MHz channels.

In some examples, communication network 100 can include one or more base stations 160. The one or more base stations 160 may include macro cell base stations (high power cellular base stations) and/or small cell base stations (low power cellular base stations). In an aspect, the macro cell base station may include eNBs and/or ng-eNBs that corresponds to a 4G/LTE network, or gNBs that corresponds to a 5G/NR network, or a combination of both, and the small cell base stations may include femtocells, picocells, microcells, etc.

The one or more base stations 160 may collectively form a radio access network (RAN) and interface with a core network 170 (e.g., an evolved packet core (EPC) or a 5G core (5GC)) through backhaul links 122, and through the core network 170 to one or more servers 172 (which may be part of core network 170 or may be external to core network 170). In addition to other functions, the one or more base stations 160 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages.

The one or more base stations 160 may wirelessly communicate with the UEs, such as UE 104a, via communication link 120. The communication links 120 between the one or more base station 160 and the UEs 104 may include uplink (also referred to as reverse link) transmissions from a UE (e.g., UE 104a, 104b, 104c, and/or 104d) to the base station 160 and/or downlink (also referred to as forward link) transmissions from the base station 160 to one or more of the UEs 104. The communication links 120 may use MIMO antenna technology, including spatial multiplexing, beamforming, and/or transmit diversity. The communication links 120 may be through one or more carrier frequencies.

Each of the UEs 104 in communication network 100 may be configured to perform RF sensing functions for generating an indoor map. The RF sensing functions can be implemented using any of the RF interfaces present in UEs 104 that are capable of simultaneously transmitting and receiving RF signals. UEs 104 can transfer data related to indoor mapping (e.g., RF Sensing data, partial map data, location data, orientation data, etc.) by utilizing communication network 100.

In some examples, UEs 104 can communicate with one or more servers, such as server 172, for the purpose of generating an indoor map. Communication with server 172 can be made via core network 170, which may be accessed by UEs 104 by utilizing communications links with base station 160 or AP 102. AP 102 can access the core network, including server 172, via communications link 112.

Figure 2:
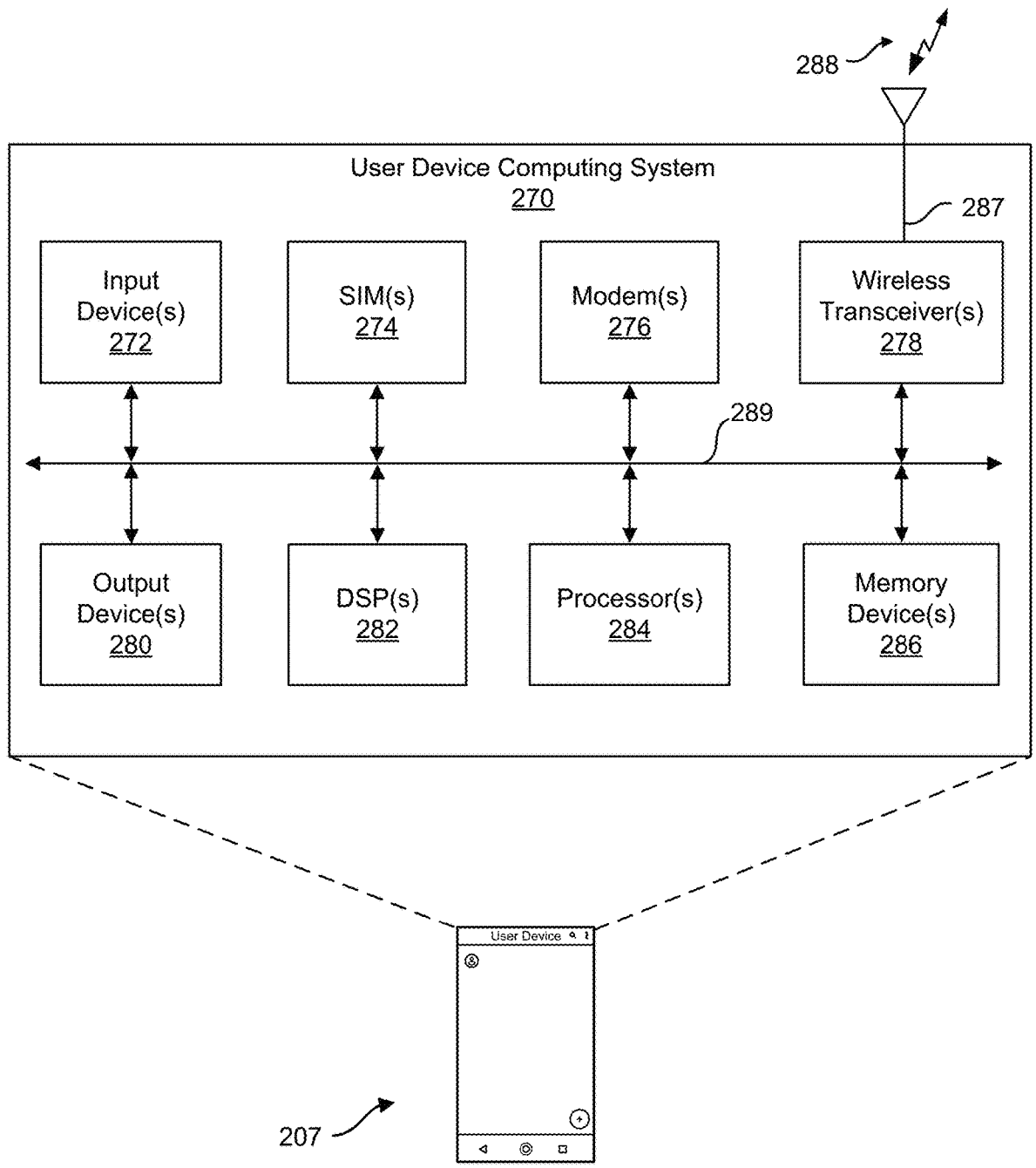
FIG. 2 is a block diagram illustrating an example of a computing system of a user device, in accordance with some examples.

FIG. 2 illustrates an example of a computing system 270 of a user device 207. The user device 207 is an example of a UE that can be used by an end-user. For example, the user device 207 can include a mobile phone, router, tablet computer, laptop computer, wearable device (e.g., a smart watch, glasses, an XR device, etc.), Internet of Things (IoT) device, and/or another device used by a user to communicate over a wireless communications network. The computing system 270 includes software and hardware components that can be electrically or communicatively coupled via a bus 289 (or may otherwise be in communication, as appropriate). For example, the computing system 270 includes one or more processors 284. The one or more processors 284 can include one or more CPUs, ASICs, FPGAs, APs, GPUs, VPUs, NSPs, microcontrollers, dedicated hardware, any combination thereof, and/or other processing device or system. The bus 289 can be used by the one or more processors 284 to communicate between cores and/or with the one or more memory devices 286.

The computing system 270 may also include one or more memory devices 286, one or more digital signal processors (DSPs) 282, one or more subscriber identity modules (SIMs) 274, one or more modems 276, one or more wireless transceivers 278, one or more antennas 287, one or more input devices 272 (e.g., a camera, a mouse, a keyboard, a touch sensitive screen, a touch pad, a keypad, a microphone, and/or the like), and one or more output devices 280 (e.g., a display, a speaker, a printer, and/or the like).

The one or more wireless transceivers 278 can receive wireless signals (e.g., signal 288) via antenna 287 from one or more other devices, such as other user devices, network devices (e.g., base stations such as eNBs and/or gNBs, Wi-Fi access points (APs) such as routers, range extenders or the like, etc.), cloud networks, and/or the like. In some examples, the computing system 270 can include multiple antennas or an antenna array that can facilitate simultaneous transmit and receive functionality. Antenna 287 can be an omnidirectional antenna such that RF signals can be received from and transmitted in all directions. The wireless signal 288 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network. In some examples, the one or more wireless transceivers 278 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 288 into a baseband or intermediate frequency and can convert the RF signals to the digital domain.

In some cases, the computing system 270 can include a coding-decoding device (or CODEC) configured to encode and/or decode data transmitted and/or received using the one or more wireless transceivers 278. In some cases, the computing system 270 can include an encryption-decryption device or component configured to encrypt and/or decrypt data (e.g., according to the AES and/or DES standard) transmitted and/or received by the one or more wireless transceivers 278.

The one or more SIMs 274 can each securely store an international mobile subscriber identity (IMSI) number and related key assigned to the user of the user device 207. The IMSI and key can be used to identify and authenticate the subscriber when accessing a network provided by a network service provider or operator associated with the one or more SIMs 274. The one or more modems 276 can modulate one or more signals to encode information for transmission using the one or more wireless transceivers 278. The one or more modems 276 can also demodulate signals received by the one or more wireless transceivers 278 in order to decode the transmitted information. In some examples, the one or more modems 276 can include a Wi-Fi modem, a 4G (or LTE) modem, a 5G (or NR) modem, and/or other types of modems. The one or more modems 276 and the one or more wireless transceivers 278 can be used for communicating data for the one or more SIMs 274.

The computing system 270 can also include (and/or be in communication with) one or more non-transitory machine-readable storage media or storage devices (e.g., one or more memory devices 286), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 286 and executed by the one or more processor(s) 284 and/or the one or more DSPs 282. The computing system 270 can also include software elements (e.g., located within the one or more memory devices 286), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 3:
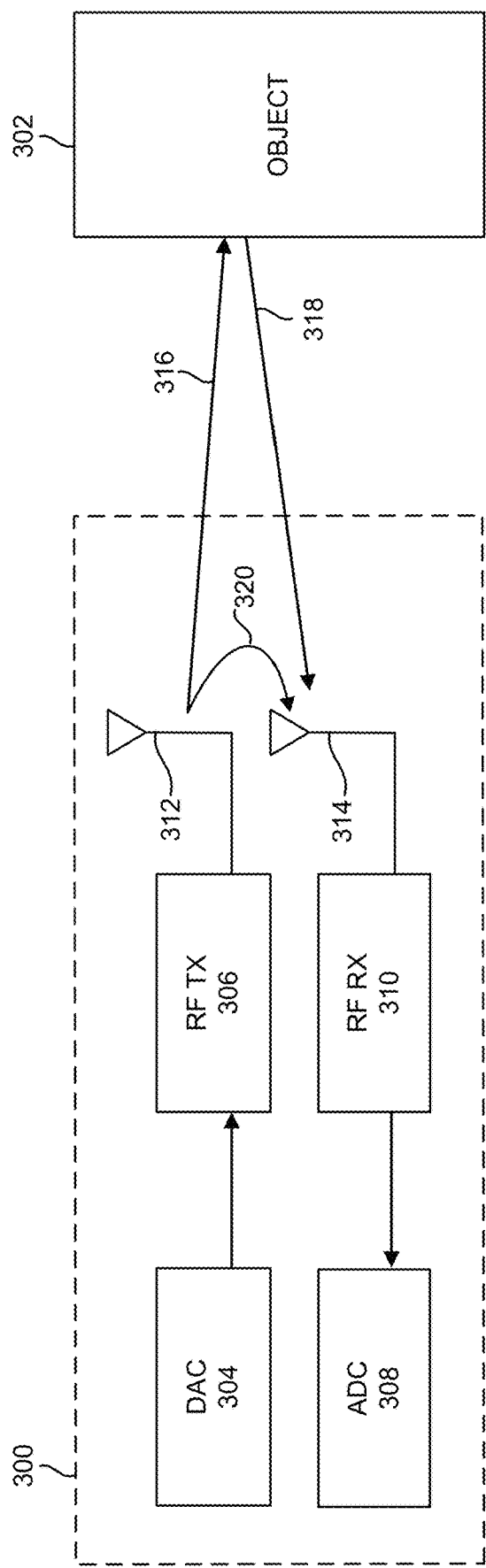
FIG. 3 is a diagram illustrating an example of a wireless device utilizing radio frequency (RF) sensing techniques to perform indoor mapping, in accordance with some examples.

As noted above, systems and techniques are described herein for performing mapping (e.g., indoor mapping and/or other type of mapping) using radio frequency (RF) sensing. FIG. 3 is a diagram illustrating an example of a wireless device 300 that utilizes RF sensing techniques to detect an object 302 in order to perform indoor mapping. In some examples, wireless device 300 can be a mobile phone, a wireless access point, or some other device that includes at least one RF interface.

In some aspects, wireless device 300 can include one or more components for transmitting an RF signal. Wireless device 300 can include a digital-to-analog converter (DAC) 304 that is capable of receiving a digital signal or waveform (e.g., from a microprocessor, not illustrated) and converting it to an analog waveform. The analog signal that is the output of DAC 304 can be provided to RF transmitter 306. RF transmitter 306 can be a Wi-Fi transmitter, a 5G/NR transmitter, a Bluetooth™ transmitter, or any other transmitter capable of transmitting an RF signal.

RF transmitter 306 can be coupled to one or more transmitting antennas such as TX antenna 312. In some examples, TX antenna 312 can be an omnidirectional antenna that is capable of transmitting an RF signal in all directions. For example, TX antenna 312 can be an omnidirectional Wi-Fi antenna that can radiate Wi-Fi signals (e.g., 2.4 GHz, 5 GHz, 6 GHz, etc.) in a 360-degree radiation pattern. In another example, TX antenna 312 can be a directional antenna that transmits an RF signal in a particular direction.

In some examples, wireless device 300 can also include one or more components for receiving an RF signal. For example, the receiver lineup in wireless device 300 can include one or more receiving antennas such as RX antenna 314. In some examples, RX antenna 314 can be an omnidirectional antenna capable of receiving RF signals from multiple directions. In other examples, RX antenna 314 can be a directional antenna that is configured to receive signals from a particular direction. In further examples, both TX antenna 312 and RX antenna 314 can include multiple antennas (e.g., elements) configured as an antenna array (e.g., linear antenna array, 2 dimensional antenna array, 3 dimensional antenna array, or any combination thereof).

Wireless device 300 can also include an RF receiver 310 that is coupled to RX antenna 314. RF receiver 310 can include one or more hardware components for receiving an RF waveform such as a Wi-Fi signal, a Bluetooth™ signal, a 5G/NR signal, or any other RF signal. The output of RF receiver 310 can be coupled to an analog-to-digital converter (ADC) 308. ADC 308 can be configured to convert the received analog RF waveform into a digital waveform that can be provided to a processor such as a digital signal processor (not illustrated).

In one example, wireless device 300 can implement RF sensing techniques by causing TX waveform 316 to be transmitted from TX antenna 312. Although TX waveform 316 is illustrated as a single line, in some techniques, TX waveform 316 can be transmitted in all directions by an omnidirectional TX antenna 312. In one example, TX waveform 316 can be a Wi-Fi waveform that is transmitted by a Wi-Fi transmitter in wireless device 300. In further examples, TX waveform 316 can be implemented to have a sequence that has perfect or almost perfect autocorrelation properties. For instance, TX waveform 316 can include single carrier Zadoff sequences or can include symbols that are similar to orthogonal frequency-division multiplexing (OFDM) Long Training Field (LTF) symbols.

In some techniques, wireless device 300 can further implement RF sensing techniques by performing transmit and receive functions concurrently. For example, wireless device 300 can enable its RF receiver 310 to receive at or near the same time as it enables RF transmitter 306 to transmit TX waveform 316. In some examples, transmission of a sequence or pattern that is included in TX waveform 316 can be repeated continuously such that the sequence is transmitted a certain number of times or for a certain duration of time. In some examples, repeating a pattern in the transmission of TX waveform 316 can be used to avoid missing the reception of any reflected signals if RF receiver 310 is enabled after RF transmitter 306. In one example implementation, TX waveform 316 can include a sequence having a sequence length L that is transmitted two or more times, which can allow RF receiver 310 to be enabled at a time less than or equal to L after start of the transmission of the TX waveform 316 in order to receive reflections corresponding to the entire sequence without missing any information.

By implementing simultaneous transmit and receive functionality, wireless device 300 can receive any signals that correspond to TX waveform 316. For example, wireless device 300 can receive signals that are reflected from reflectors that are within range of TX waveform 316, such as RX waveform 318 reflected from object 302. Wireless device 300 can also receive leakage signals (e.g., TX leakage signal 320) that are coupled directly from TX antenna 312 to RX antenna 314 without reflecting from any objects. In some techniques, RX waveform 318 can include multiple sequences that correspond to multiple copies of a sequence that are included in TX waveform 316. In some examples, wireless device 300 can combine the multiple sequences that are received by RF receiver 310 to improve the signal to noise ratio (SNR).

Wireless device 300 can further implement RF sensing techniques by obtaining RF sensing data that is associated with each of the received signals corresponding to TX waveform 316. In some examples, the RF sensing data can include channel state information (CSI) based on data relating to the direct paths (e.g., leakage signal 320) of TX waveform 316 together with data relating to the reflected paths (e.g., RX waveform 318) that correspond to TX waveform 316.

In some techniques, RF sensing data (e.g., CSI data) can include information that can be used to determine the manner in which an RF signal (e.g., TX waveform 316) propagates from RF transmitter 306 to RF receiver 310. RF sensing data can include data that corresponds to the effects on the transmitted RF signal due to multi-path propagation, scattering, fading, and power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as RX waveform 318. In further examples, RF sensing data can also be used to detect motion, determine location, detect changes in location or motion patterns, obtain channel estimation, or any combination thereof. In some cases, the distance and angle of arrival of the reflected signals can be used to identify the size and position of reflectors in the surrounding environment (e.g., object 302) in order to generate an indoor map. In some aspects, RF sensing data can also be used to identify transient objects that can be omitted from an indoor map (e.g., humans or pets walking through an indoor environment).

Wireless device 300 can calculate distances and angles of arrival corresponding to reflected waveforms (e.g., the distance and angle of arrival corresponding to RX waveform 318) by utilizing signal processing, machine learning algorithms, using any other suitable technique, or any combination thereof. In other examples, wireless device 300 can send the RF sensing data to another computing device, such as a server, that can perform the calculations to obtain the distance and angle of arrival corresponding to RX waveform 318 or other reflected waveforms.

In one example, the distance of RX waveform 318 can be calculated by measuring the difference in time from reception of the leakage signal to the reception of the reflected signals. For example, wireless device 300 can determine a baseline distance of zero that is based on the difference from the time the wireless device 300 transmits TX waveform 316 to the time it receives leakage signal 320 (e.g., propagation delay). Wireless device 300 can then determine a distance associated with RX waveform 318 based on the difference from the time the wireless device 300 transmits TX waveform 316 to the time it receives RX waveform 318, which can then be adjusted according to the propagation delay associated with leakage signal 320. In doing so, wireless device 300 can determine the distance traveled by RX waveform 318 which can be used to determine the distance of a reflector (e.g., object 302) that caused the reflection.

In further examples, the angle of arrival of RX waveform 318 can be calculated by measuring the time difference of arrival of RX waveform 318 between individual elements of a receive antenna array, such as antenna 314. In some examples, the time difference of arrival can be calculated by measuring the difference in received phase at each element in the receive antenna array.

In some techniques, the distance and the angle of arrival of RX waveform 318 can be used to determine the distance between wireless device 300 and object 302 as well as the position of object 302 relative to wireless device 300. The distance and the angle of arrival of RX waveform 318 can also be used to determine the size and shape of object 302 that causes the reflection. For example, wireless device 300 can utilize the calculated distance and angle of arrival corresponding to RX waveform 318 to determine the point at which TX waveform 316 reflected from object 302. Wireless device 300 can aggregate the reflection points for various reflected signals to determine the size and shape of the object 302.

As noted above, wireless device 300 can include mobile devices such as smartphones, laptops, tablets, etc. In some examples, wireless device 300 can be configured to obtain device location data and device orientation data together with the RF sensing data. In some instances, device location data and device orientation data can be used to determine or adjust the distance and angle of arrival of a reflected signal such as RX waveform 318. For example, a user may be holding wireless device 300 and walking through a room during the RF sensing process. In this instance, wireless device 300 can have a first location and a first orientation when it transmits TX waveform 316 and can have a second location and a second orientation when it receives RX waveform 318. Wireless device 300 can account for the change in location and the change in orientation when it processes the RF sensing data to calculate the distance and angle of arrival. For example, the location data, the orientation data, and the RF sensing data can be correlated based on a time-stamp associated with each element of data. In some techniques, the combination of the location data, the orientation data, and the RF sensing data can be used to determine the size and location of object 302.

In some examples, device position data can be gathered by wireless device 300 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 300, such as a gyroscope, an accelerometer, a compass, a magnetometer, any other suitable sensor, or any combination thereof. For instance, a gyroscope on wireless device 300 can be used to detect or measure changes in orientation of wireless device 300 (e.g., relative orientation) and a compass can be used to detect or measure absolute orientation of wireless device 300.

Figure 4:
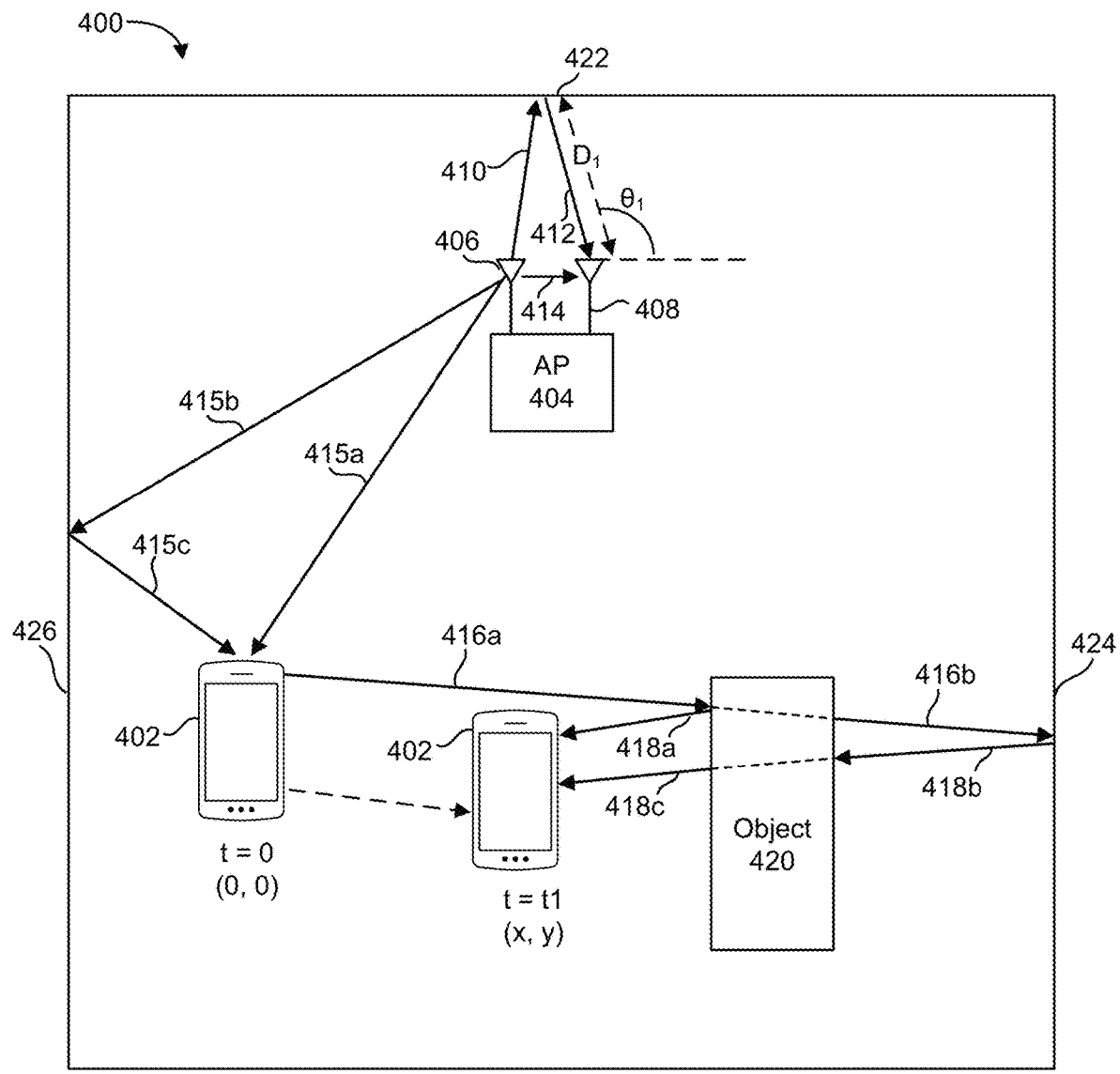
FIG. 4 is a diagram illustrating an example of an indoor environment including wireless devices for performing indoor mapping, in accordance with some examples.

FIG. 4 is a diagram illustrating an indoor environment 400 that can include one or more wireless devices configured to perform RF sensing in order to create an indoor map. In some examples, indoor environment 400 can include one or more mobile wireless devices (e.g., mobile device 402) and/or one or more stationary wireless devices (e.g., access point (AP) 404) that can be configured to perform RF sensing in order to create an indoor map of indoor environment 400.

In one aspect, AP 404 can be a Wi-Fi access point having a static or fixed location within indoor environment 400. Although indoor environment 400 is illustrated as having an access point (e.g., AP 404), any type of stationary wireless device (e.g., desktop computer, wireless printer, camera, smart television, smart appliance, etc.) can be configured to perform the techniques described herein. In one example, AP 404 can include hardware and software components that can be configured to simultaneously transmit and receive RF signals, such as the components described herein with respect to wireless device 300. For example, AP 404 can include one or more antennas that can be configured to transmit an RF signal (e.g., TX antenna 406) and one or more antennas that can be configured to receive an RF signal (e.g., RX antenna 408). As noted with respect to wireless device 300, AP 404 can include omnidirectional antennas or antenna arrays that are configured to transmit and receive signals from any direction.

In one aspect, AP 404 can transmit an RF signal 410 that can reflect off of various reflectors (e.g., static or dynamic objects located within a scene, structural element such as walls, ceilings, or other barriers, and/or other objects) located in indoor environment 400. For example, RF signal 410 can reflect from a wall 422 and cause a reflected signal 412 to be received by AP 404 via RX antenna 408. Upon transmitting RF signal 410, AP 404 can also receive a leakage signal 414 corresponding to a direct path from TX antenna 406 to RX antenna 408.

In some techniques, AP 404 can obtain RF sensing data associated with reflected signal 412. For example, RF sensing data can include CSI data corresponding to reflected signal 412. In further aspects, AP 404 can use the RF sensing data to calculate a distance $D_1$ and an angle of arrival $\theta_1$ corresponding to reflected signal 412. For example, AP 404 can determine distance $D_1$ by calculating a time of flight for reflected signal 412 based on the difference or phase shift between leakage signal 414 and reflected signal 412. In further examples, AP 404 can determine angle of arrival $\theta_1$ by utilizing an antenna array to receive the reflected signals and measuring the difference in received phase at each element of the antenna array.

In some techniques, AP 404 can utilize the distance $D_1$ and an angle of arrival $\theta_1$ corresponding to one or more reflected signals (e.g., reflected signal 412) to identify wall 422. In some aspects, AP 404 can generate a map of indoor environment 400 that includes a reference to wall 422. In further aspects, AP 404 can communicate with a server (e.g., server 172) to provide data for modifying a map of indoor environment 400 to include a reference to wall 422. In further examples, AP 404 can gather RF sensing data and provide the RF sensing data to a server for processing the calculations of time of flight and angle of arrival for the reflected signals.

In further examples, indoor environment 400 can also include mobile device 402. Although illustrated as a smart phone, mobile device 402 can include any type of mobile device such as a tablet, laptop, smartwatch, etc. According to some techniques, mobile device 402 can be configured to perform RF sensing in order to create or modify an indoor map pertaining to indoor environment 400.

In one example, mobile device 402 can cause an RF waveform 416a to be transmitted via one of its RF transmitters, such as RF transmitter 306. As illustrated, RF waveform 416a is transmitted at a time t=0 at location (0,0). In some instances, mobile device 402 can be moving while it is performing RF sensing such that it is in a different location at a later time, which is illustrated as (x, y) at time t=t1.

In another example, RF waveform 416a can reflect from object 420 and cause reflected waveform 418a to be received by mobile device 402 at time t=t1. In a further example, the wavelength of RF waveform 416a can be configured to permit it to penetrate and/or traverse object 420 and reflect from wall 424. The reflection 418b from wall 424 can likewise traverse object 420 and result in a second reflected waveform 418c being received by mobile device 402 at a later time, e.g., t=t2 (not illustrated).

In some techniques, mobile device 402 can gather RF sensing data corresponding to reflected waveforms 418a and 418c. In further aspects, mobile device 402 can also capture device location data and device orientation data that corresponds to the time (e.g., t=0) at which RF waveform 416a was transmitted and also to the times at which reflected waveforms 418a (e.g., t=t1) and 418c (e.g., t=t2 were received.

In some aspects, mobile device 402 can utilize the RF sensing data to calculate time of flight and angle of arrival for each reflected waveform 418a and 418c. In further examples, mobile device 402 can utilize the location data and orientation data to account for the device's movement during the RF sensing process. For example, the time of flight of reflected waveforms 418a and 418c can be adjusted based on the device's movement towards object 420 and wall 424, respectively. In another example, the angle of arrival of reflected waveforms 418a and 418c can be adjusted based on the movement and orientation of mobile device at the time it transmitted RF waveform 416a versus the time mobile device 402 received reflected waveforms 418a and 418c.

Figure 5:
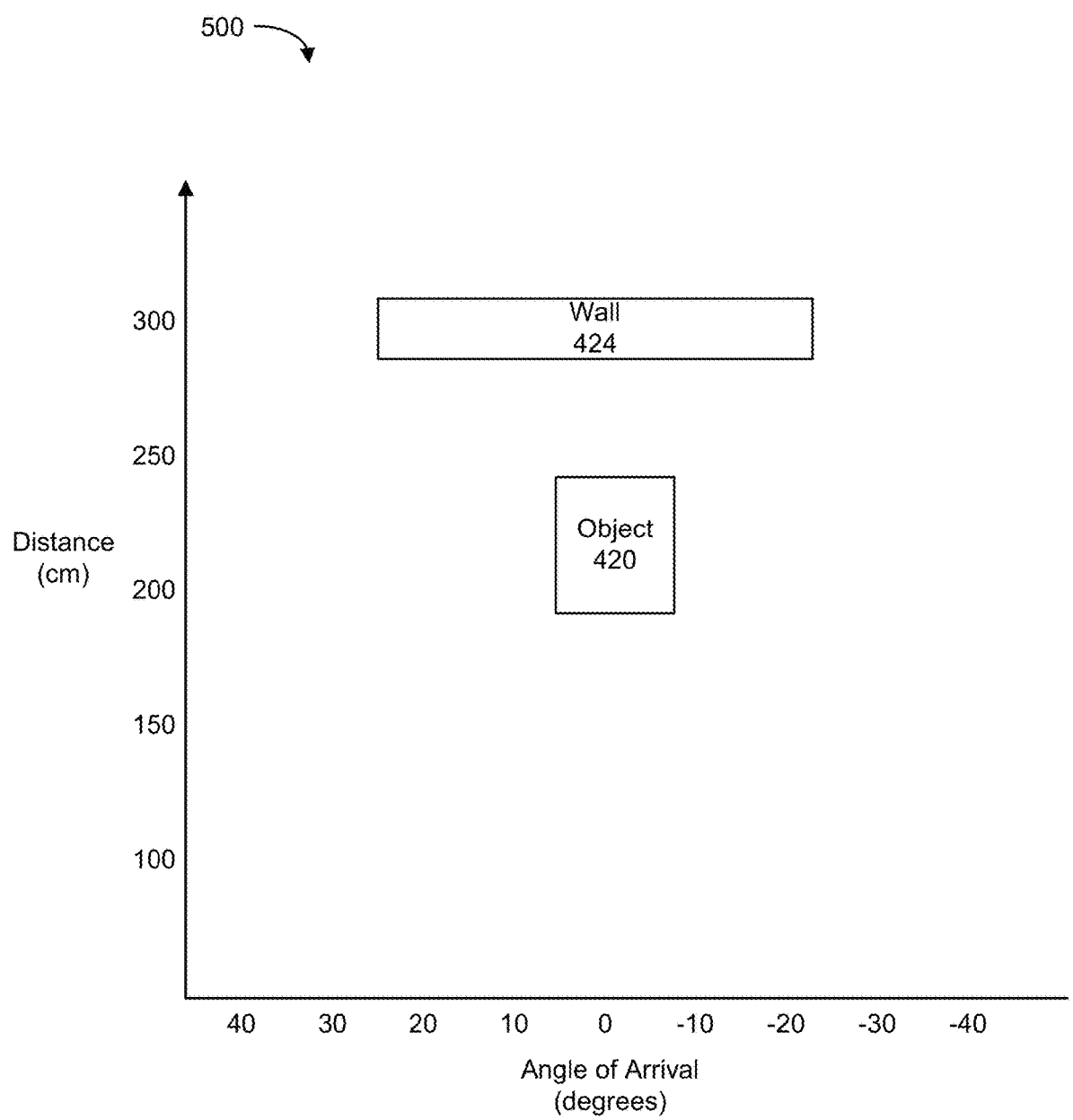
FIG. 5 is an example of a graphical representation depicting sizes and positions of objects detected based on RF sensing techniques, in accordance with some examples.

In some techniques, mobile device 402 can utilize the time of flight, angle of arrival, location data, and orientation data to determine a size and position of object 420 and wall 424. FIG. 5 is an example of a graphical representation 500 that depicts the size and position of an object 420 and a wall 424 based on RF sensing that can be performed by mobile device 402.

As illustrated, the graphical representation 500 can include angle of arrival in degrees on the x-axis and distance in centimeters on the y-axis. The graphical representation 500 can further include references to object 420 and wall 424 that are based on the angle of arrival and time of flight of reflected signals. The graphical representation 500 illustrates that RF sensing techniques can be used to detect reflections from reflectors that are positioned behind one another. In this example, RF waveform 416a produced a first reflection from object 420 and a second reflection from wall 424, which were received by mobile device 402.

As noted with respect to AP 404, mobile device 402 can utilize the distance, angle of arrival, location, and orientation data to identify the size and shape of object 420 and wall 424. In some techniques, mobile device 402 can use the distance, angle of arrival, location, and orientation data to create a map of an indoor environment 400 that includes references to object 420 and wall 424. In other techniques, mobile device 402 can use the RF sensing data to modify a partial map that it receives from a server, such as server 172. In other aspects, mobile device 402 can send the RF sensing data to a server for processing and creation of an indoor map of indoor environment 400.

In some examples, AP 404 and mobile device 402 can be configured to implement a bistatic configuration in which the transmit and receive functions are performed by different devices. For example, AP 404 (and/or other device within the indoor environment 400 that is static or stationary) can transmit an omnidirectional RF signal that can include signal 415a and 415b. As illustrated, signal 415a can travel directly (e.g., no reflections) from AP 404 to mobile device 402. Signal 415b can reflect off of a wall 426 and cause a corresponding reflected signal 415c to be received by mobile device 402.

In some cases, mobile device 402 can utilize RF sensing data associated with the direct signal path (e.g., signal 415a) and the reflected signal path (e.g., signal 415c) to identify the size and shape of reflectors (e.g., wall 426). For instance, mobile device 402 can obtain, retrieve, and/or estimate location data associated with AP 404. In some aspects, mobile device 402 can use location data associated with AP 404 and RF sensing data (e.g., CSI data) to determine time of flight, distance, and/or angle of arrival associated with signals transmitted by AP 404 (e.g., direct path signals such as signal 415a and reflected path signals such as signal 415c). In some cases, mobile device 402 and AP 404 can further send and/or receive communication that can include data associated with RF signal 415a and/or reflected signal 415c (e.g., transmission time, sequence/pattern, time of arrival, time of flight, angle of arrival, etc.).

In some examples, mobile device 402 and/or AP 404 can obtain RF sensing data in the form of CSI data that can be used to formulate a matrix that is based on the number of frequencies represented as 'K' (e.g., tones) and the number of receive antenna array elements represented as 'N'. In one technique, the CSI matrix can be formulated according to the relationship given by equation (1):

$$\text{CSI Matrix}: H=[h_{ik}], i=1, \ldots, N, k=1, \ldots, K \quad (1)$$

Upon formulating the CSI matrix, mobile device 402 and/or AP 404 can calculate the angle of arrival and time of flight for direct signal paths as well as reflected signal paths by utilizing a Two-Dimensional Fourier transform. In one example, the Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; l corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N} \sum_{k=1}^{K} h_{ik} e^{j\frac{2\pi f_0 i l \sin\theta}{c}} e^{j\frac{2\pi d k \Delta f}{c}} \quad (2)$$

In some techniques, mobile device 402 and AP 404 can perform RF sensing techniques irrespective of their association with each other or with a Wi-Fi network. For example, mobile device 402 can utilize its Wi-Fi transmitter and Wi-Fi receiver to perform RF sensing as discussed herein when it is not associated with any access point or Wi-Fi network. In further examples, AP 404 can perform RF sensing techniques regardless of whether it has any wireless devices associated with it.

In some examples, mobile device 402 and AP 404 can exchange data relating to their respective indoor maps for indoor environment 400 to create a map that includes references to all reflectors (e.g., static objects, dynamic objects, structural elements) detected by both mobile device 402 and AP 404. In other aspects, the RF sensing data from mobile device 402 and AP 404 can be sent to one or more servers that can aggregate the data to generate or modify an indoor map.

In some examples, a server device can obtain (e.g., crowdsource) RF sensing data from a plurality of wireless devices located within an indoor environment (e.g., indoor environment 400). The server device can use the RF sensing data from multiple devices to identify and classify different reflectors. For example, the server device may determine that a reflector is a transient object (e.g., a pet or a human walking through the environment) by using the RF sensing data to track movement of the object or by determining that data corresponding to the object was temporal and/or not confirmed by RF sensing data from other wireless devices. In some aspects, the server device can omit and/or remove references to transient objects from an indoor map.

In another example, a server device may use RF sensing data from a plurality of wireless devices to determine that a reflector corresponds to a structural element such as a door, a window, a wall, a floor, a ceiling, a roof, a column, a staircase, or any combination thereof. In some aspects, the server device can include a reference in an indoor map that indicates a type of structural element. In some cases, the server device may use RF sensing data from a plurality of wireless devices to determine that a reflector corresponds to a static object such as a piece of furniture, an appliance, a fixture (e.g., blinds/shades, ceiling fans, plants, rugs, lamps, etc.). In some examples, the server device can include a reference in an indoor map that indicates a type of static object.

In some aspects, a server device may use RF sensing data from a plurality of wireless devices to determine a plurality of position measurements that correspond to one or more reflectors. For example, two or more wireless devices may provide the server with RF sensing data corresponding to the same reflector. In some aspects, RF sensing data received from different wireless devices corresponding to the same reflector may result in different position measurements due to factors such as measurement errors, environment variance, variation in signal propagation delays, semiconductor process variations, device configurations, any other factor that may affect RF sensing, and/or any combination thereof. In some cases, a server device may perform statistical analysis on RF sensing data to determine the position of a reflector. For example, a server device may determine the position of a reflector by using RF sensing data to calculate mean, median, mode, standard deviation, range, standard score, any other statistical parameter, and/or any combination thereof. In some aspects, a server device may assign weights and/or values to RF sensing data and/or measurements received from different wireless devices. In some cases, a server device may filter and/or discard RF sensing data from one or more wireless devices based on statistical analysis, processing, artificial intelligence, and/or machine learning algorithms.

In some examples, a server device may use location data and/or orientation data corresponding to multiple wireless devices to correlate or align the RF sensing data received from the wireless devices. For example, a server device may correlate RF sensing data from AP 404 and mobile device 402 as corresponding to object 420 based on the location data and/or orientation data associated with AP 404 and mobile device 402. In some aspects, a server device may use algorithms that process RF sensing data in order to interpolate and/or extrapolate position, shape, size, and/or existence of one or more reflectors in an indoor environment. For example, RF sensing data received from multiple wireless devices can be processed by a server device in order to determine boundaries (e.g., walls, ceiling, floors, etc.) associated with a particular indoor environment or venue.

Figure 6:
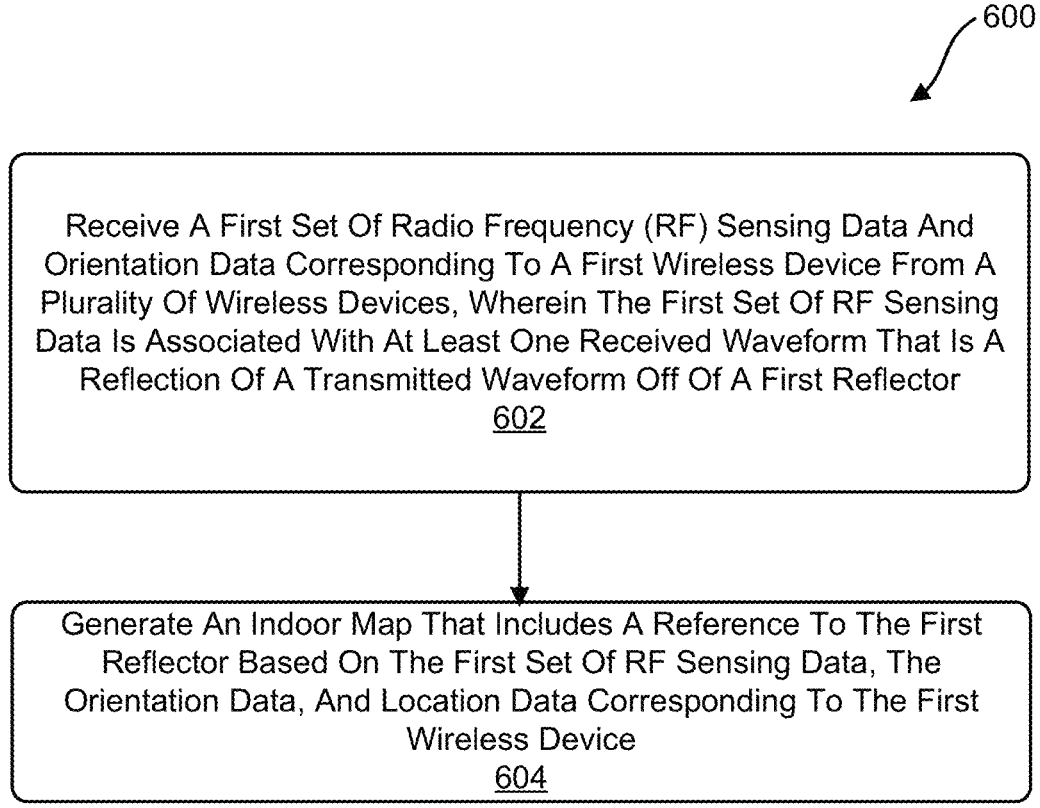
FIG. 6 is a flow diagram illustrating an example of a process for indoor mapping, in accordance with some examples.

FIG. 6 is a flow diagram illustrating an example of a process 600 for performing indoor mapping. At operation 602, the process 600 includes receiving a first set of RF sensing data and orientation data corresponding to a first wireless device from a plurality of wireless devices. The first set of RF sensing data is associated with at least one received waveform that is a reflection of a transmitted waveform of a first reflector. In some examples, the transmitted waveform can include a signal (e.g., a Wi-Fi signal, a New Radio (NR) signal, a RADAR signal, a Bluetooth™ and/or an Ultra-wideband (UWB) signal) that can be transmitted by an antenna from a wireless device such as device 207. In further examples, the first set of RF sensing data can include CSI data corresponding to reflections received in response to transmission of a signal. In one illustrative example, the first set of RF sensing data can include Wi-Fi CSI data corresponding to reflections received in response to transmission of a Wi-Fi signal. In other examples, the first set of RF sensing data can include CSI data obtained using 5G NR, Bluetooth™, UWB, 60 GHz mmWave, any combination thereof, or other type of signal(s).

In some implementations, the first set of RF sensing data and orientation data can be received by a server device from a wireless device (e.g., user equipment (UE), a station (STA), or other device) having an RF interface that is configured to perform RF sensing. The wireless device can send the RF sensing data to the server device to avoid the computational overhead associated with processing the RF sensing data. In some examples, the server device can receive RF sensing data from multiple wireless devices located within the same indoor environment and can aggregate the data to generate or develop a more comprehensive indoor map for the indoor environment. In some cases, the wireless device can be provided with the indoor map (e.g., from the server device). In some examples, the server device may send a communication to a wireless device requesting RF sensing data for indoor mapping (e.g., the server may determine that the wireless device is located in a room or building for which the server is creating or maintaining an indoor map).

In some aspects, the server device can use RF sensing data from a plurality of wireless devices to identify one or more reflectors (e.g., transient objects, static objects, structural elements, etc.) in an indoor environment. For example, in some cases the server device can receive a plurality of RF sensing data sets corresponding to the plurality of wireless devices, wherein the plurality of RF sensing sets are associated with a plurality of received waveforms that are reflections of at least one transmitted waveform off of the first reflector. In some aspects, the server can determine a plurality of position measurements associated with the first reflector based on the plurality of RF sensing data sets. In some cases, the server can determine a location of the first reflector based on the plurality of position measurements. In some examples, the location can be determined by performing statistical analysis on the plurality of position measurements (e.g., finding an average, mean, median, standard deviation, etc.).

In some cases, the server device can use the plurality of RF sensing data sets from a plurality of wireless device to determine that the first reflector corresponds to a transient object (e.g., human, pet, robot, etc.). In response to determining that the first reflector corresponds to a transient object, the server device can remove and/or otherwise omit the reference to the first reflector from the indoor map. In some examples, the server device can use the plurality of RF sensing data sets corresponding to the plurality of wireless devices to determine that the first reflector corresponds to a structural element. In some aspects, the reference to the first reflector can indicate a type of structural element (e.g., a door, a window, a wall, a floor, a ceiling, a roof, a column, or a combination thereof). In some cases, the server device can use the plurality of RF sensing data sets corresponding to the plurality of wireless devices to determine that the first reflector corresponds to a static object. In some examples, the reference to the first reflector can indicate a type of static object (e.g., a piece of furniture, an appliance, a fixture, or a combination thereof).

In some aspects, the server can determine a distance and an angle of arrival between the wireless device and the first reflector based on the first set of RF sensing data. In some examples, the determination of the distance can be based on the time of flight of the reflected signal that is adjusted based on the propagation delay of the direct path (e.g., leakage signal between the transmitting antenna and the receiving antenna). In some examples, the angle of arrival can be based on the differences in signal phase measured at each element of a receiver antenna array. In some examples, the first set of RF sensing data can include a distance and an angle of arrival between the first wireless device and the first reflector. For example, a wireless device may calculate the distance and angle of arrival and send the result of the calculation(s) to the server.

At operation 604, the process 600 includes generating an indoor map that includes a reference to the first reflector based on the first set of RF sensing data, the orientation data, and location data corresponding to the first wireless device. For instance, in some aspects, the server device can generate the indoor map based on the first set of RF sensing data, the orientation data, and the location data. In some examples, the location data can be derived from the RF sensing data. In other examples, the location data can be obtained using techniques that measure round trip time (RTT), Passive Positioning, Angle of Arrival (AoA), Received Signal Strength Indicator (RSSI), or any combination thereof.

In further examples, the location data can include either a relative or an absolute location. For example, the location data can be a relative location inside of a building with no reference to the building's location on a map. In other examples, the location data may include an absolute location. For instance, a wireless device (e.g., user equipment (UE), a station (STA), or other device) located inside of a building may obtain a GPS fix when it is positioned near a window, on a balcony, or at any other location that facilitates line of sight communication with a GPS satellite. In this instance, the absolute location of the device can be used to associate an indoor map with an absolute location (e.g., an address on a map, GPS coordinates, etc.).

In some techniques, the device orientation data can be obtained from one or more sensors on the mobile device, such as from one or more accelerometers, compasses, and/or gyroscopes, for example. For instance, a gyroscope can be used to estimate orientation changes (e.g., relative orientation) of the mobile device, and a compass can be used to estimate an absolute orientation of the mobile device. In some cases, gyroscope and compass measurements can both be used to determine the absolute orientation of the mobile device. In some implementations, the location data and orientation data can be correlated with the distance and the angle of arrival based on timestamps that are associated with each. The correlated data can be used to determine the size and/or position of an object that caused the signal reflection. An indoor map may then be generated or modified to include a reference to the object.

As noted with respect to the mobile device 402 of FIG. 4, movement of a device (e.g., change in position or change in orientation) during RF sensing can affect the manner in which reflected waveforms are received. In some examples, the wireless device or server device can make a determination that the wireless device moved during the RF sensing process. In response, the distance and angle of arrival can be adjusted to account for the movement. The adjustment can be made according to wireless device position/location data and orientation data that is obtained at or about the same time as receiving a reflected waveform. Unless explicitly stated otherwise, position data and location data, as used herein, can refer to a position and/or a change in a position/location. Orientation data may refer to an orientation and/or a change in an orientation.

In some aspects, RF sensing can be performed by two or more wireless devices, as illustrated with respect to FIG. 4 (e.g., mobile device 402 and AP 404). For example, RF sensing data corresponding to a second wireless device can be used to determine a second distance and a second angle of arrival between the second wireless device and a second object. Referring to FIG. 4, mobile device 402 can correspond to a first wireless device that determines distance and angle of arrival of reflected signals from object 420 (e.g., first object) and AP 404 can correspond to a second wireless device that determines distance and angle of arrival of reflected signal from wall 422 (e.g., second object). In some examples, the first wireless device (e.g., mobile device 402) may not be associated with the second wireless device (e.g., AP 404). In other examples, the first wireless device may be associated with the second wireless device (e.g., AP 404 may provide Wi-Fi connectivity to mobile device 402).

In some examples, RF sensing data corresponding to the first wireless device may overlap with RF sensing data corresponding to the second wireless device and can include reflections from at least one common object. Referring to FIG. 4, mobile device 402 and AP 404 can each determine distance and angle of arrival of reflected signals from object 420 (reflections from AP 404 not illustrated). In some aspects, the corresponding indoor maps generated from the respective RF sensing data may overlap insofar as each map can include references to at least one common object. In some cases, the overlap between the RF sensing data and/or the corresponding indoor maps may be used by a server device to establish a spatial relationship between the sets of RF sensing data and/or the indoor maps. Based on the spatial relationship, a combined indoor map may be generated that includes references to all the objects present in both sets of RF sensing data (e.g., data from each wireless device). In some configurations, a server device can combine data based on the RF sensing data, the indoor maps (e.g., through a stitching process), the references identified in the indoor maps, or any combination thereof. In some aspects, a combined indoor map may be generated without knowledge of the respective locations and orientations of the first and second wireless device. In some cases, location data and/or orientation data can be used by the server device to support the generation of the combined indoor map, e.g. by selectively combining RF sensing data and/or indoor maps from wireless devices based on a spatial relationship of the wireless device (e.g., located in the same room and/or generally oriented in the same direction).

In response to a determination that the first wireless device and the second wireless device are located in a same indoor environment (e.g., indoor environment 400), the indoor map can be modified to include a second reference to the second object. In some aspects, the first wireless device and the second wireless device can provide data (e.g., RF sensing data, references to objects, etc.) to a server that can modify the indoor map. In some examples, the server can aggregate data from multiple wireless devices to generate or develop a more comprehensive indoor map for the indoor environment. In some cases, the first wireless device and the second wireless device can exchange data and each wireless device may update a respective copy of an indoor map.

In some aspects, RF sensing can be performed using a bistatic configuration in which a first wireless device transmits a signal that is received by a second wireless device. For example, a Wi-Fi access point or some other wireless device can be configured to transmit the transmitted waveform that corresponds to the at least one received waveform.

Figure 7:
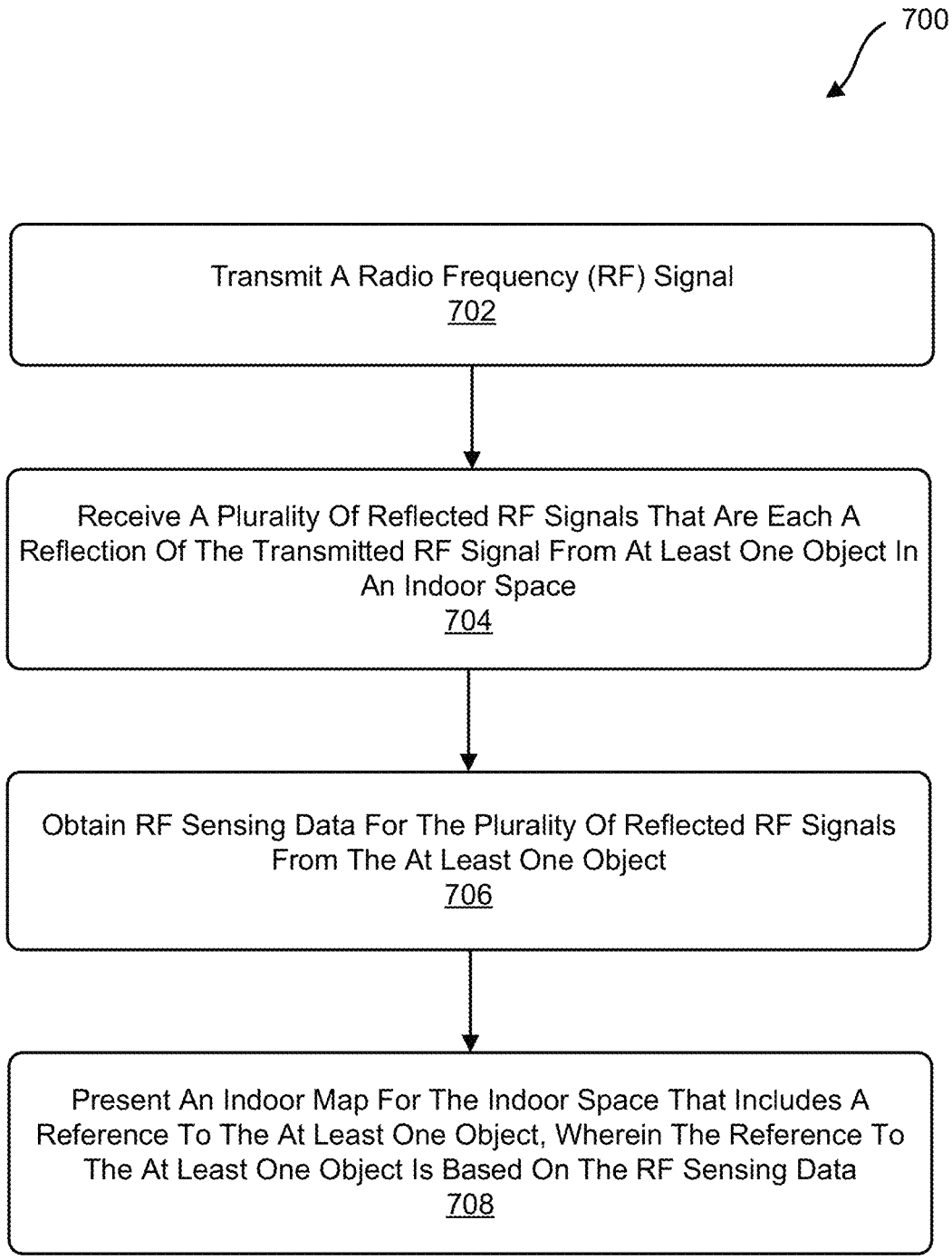
FIG. 7 is a flow diagram illustrating an example of a process for indoor mapping, in accordance with some examples.

FIG. 7 is a flow diagram illustrating an example of a process 700 for performing indoor mapping. At operation 702, the process 700 includes transmitting an RF signal. Transmitting an RF waveform can be done using any suitable RF interface on a wireless device (e.g., user equipment (UE), a station (STA), or other device), such as wireless transceivers 278 on device 207. In some examples, the transmitted RF signal can correspond to a Wi-Fi signal that can be transmitted using one or more omnidirectional antennas (e.g., antenna 287). At operation 704, the process 700 includes receiving a plurality of reflected RF signals that are each a reflection of the transmitted RF signal from at least one object in an indoor space. In some techniques, the plurality of reflected RF signals are received because the transmitted signal is radiated using an omnidirectional antenna that encounters different reflectors that are located in different directions. In further aspects, the plurality of reflected RF signals are received because the transmitted signal can radiate and reflect through and/or across objects and cause secondary reflections from objects located behind the first reflector. The RF sensing data can be used to identify the reflector that is associated with each reflected signal that is received.

At operation 706, the process 700 includes obtaining RF sensing data for the plurality of reflected signals from the at least one object. RF sensing data is captured by using components such as those described in connection with device 300. For example, an RX antenna 314 can be used to receive reflected signals that are propagated through RF receiver 310 to ADC 308 in order to capture digital samples corresponding to the reflected signals. In some techniques, the RF sense data can include both real and imaginary components corresponding to each frequency throughout a particular bandwidth. In one example, RF sensing data can include CSI data.

At operation 708, the process 700 includes presenting an indoor map for the indoor space that includes a reference to the at least one object, wherein the reference to the at least one object is based on the RF sensing data. In some aspects, the reference to the at least one object may include data indicating a location and/or extent of the object on the indoor map. In one example, a mobile device such as a smartphone can present the indoor map using an output device 280, such as a display. In another example, presenting the indoor map can include transferring the map to a different device that includes a display. For instance, an access point can present an indoor map by communicating with a mobile device within its range.

In some aspects, the wireless device that transmits and receives the RF signals can also calculate a distance and angle of arrival of reflected signals. The calculated distances and angles of arrival can be based on the RF sensing data, device location data, and/or device orientation data. In some examples, device location data can be based on the RF sensing data. In some cases, device orientation data can be obtained from one or more sensors of the mobile device, such as from one or more accelerometers, compasses, and/or gyroscopes, for example. In further techniques, the wireless device can utilize the data derived from RF sensing data to create or modify an indoor map. In some examples, the wireless device may download a partial indoor map for the indoor space and modify/edit the map to include references to any new objects/reflectors the wireless device detects. In other aspects, the wireless device may modify the partial indoor map to remove objects/reflectors no longer present in the indoor environment. In further aspects, the wireless device can send the modified indoor map to a server that may aggregate the indoor map data with data it receives from other wireless devices.

In other aspects, the wireless device that transmits and receives the RF signals can send the RF sensing data, the device location data and/or the device orientation data to a server for further processing. In some examples, the server can utilize the RF sensing data and/or the device orientation data it receives from a wireless device to calculate the distance and direction of reflectors (e.g., objects) by calculating time of flight and angle of arrival. In further examples, the server can create or modify the indoor map that includes one or more references to the newly identified objects and send the indoor map to the wireless device for presentation.

In some aspects, the server may utilize artificial intelligence or machine learning algorithms to identify or classify the reflecting object based on the RF sensing data. A server may receive RF sensing data from many different wireless devices that can be provided as input to the machine learning algorithm. In some instances, the server may perform "crowd-sourcing" of data from numerous devices to develop a more detailed indoor map. Devices that provide data to the server may or may not be associated with local networks (e.g., Wi-Fi networks) that are present in their respective indoor environment. For example, the server may receive data from devices located inside buildings that offer local Wi-Fi irrespective of the device's association with the local network. The indoor maps created and/or maintained by the server can be made accessible to UEs directly, via the internet (e.g., a webpage), via a mobile or desktop application, and/or via any other suitable manner that may be used to distribute data.

In some examples, the processes described herein (e.g., process 600, 700 and/or other process described herein) may be performed by a computing device or apparatus (e.g., a UE). In one example, the process 600 can be performed by the user device 207 of FIG. 2. In another example, the process 600 can be performed by a computing device with the computing system 800 shown in FIG. 8. For instance, a computing device with the computing architecture shown in FIG. 8 can include the components of the user device 207 of FIG. 2 and can implement the operations of FIG. 6.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
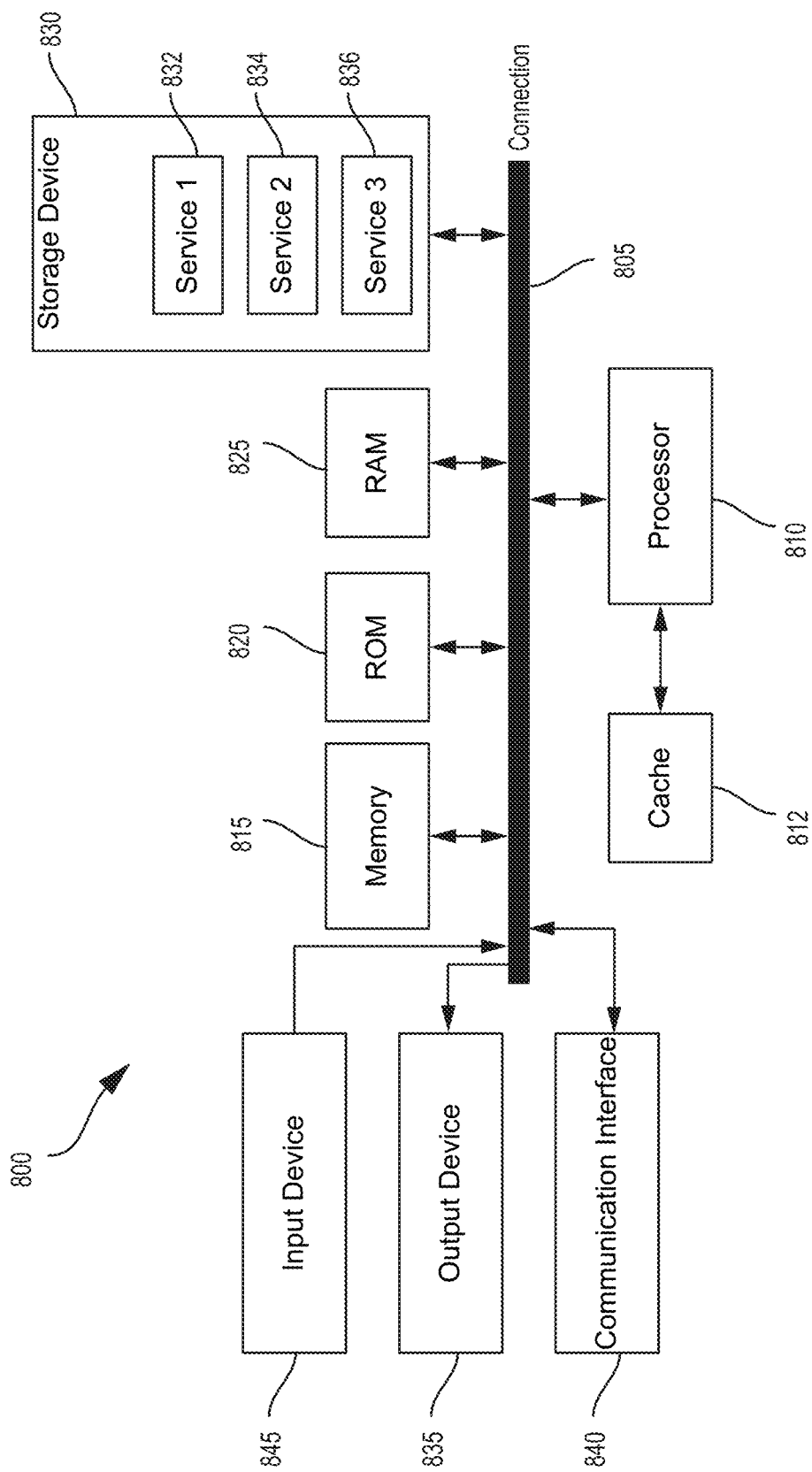
FIG. 8 is a block diagram illustrating an example of a computing system, in accordance with some examples.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that communicatively couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800.

Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for indoor mapping. The apparatus includes at least one memory and at least one processor coupled to the at least one memory. The at least one processor is configured to: receive a first set of radio frequency (RF) sensing data and orientation data corresponding to a first wireless device from a plurality of wireless devices, wherein the first set of RF sensing data is associated with at least one received waveform that is a reflection of a transmitted waveform off of a first reflector; and generate an indoor map that includes a reference to the first reflector based on the first set of RF sensing data, the orientation data, and location data corresponding to the first wireless device.

Aspect 2: The apparatus according to aspect 1, wherein the first set of RF sensing data includes a distance and an angle of arrival between the first wireless device and the first reflector.

Aspect 3: The apparatus according to aspect 1, wherein the at least one processor is configured to: determine a distance and an angle of arrival between the first wireless device and the first reflector based on the first set of RF sensing data.

Aspect 4: The apparatus according to any one of aspects 1 to 3, wherein the at least one processor is configured to: determine a movement of the first wireless device based on the orientation data and the location data; and adjust the distance and the angle of arrival based on the movement of the wireless device.

Aspect 5: The apparatus according to any one of aspects 1 to 4, wherein the at least one processor is configured to: determine a second distance and a second angle of arrival between a second wireless device and a second reflector based on a second set of RF sensing data corresponding to the second wireless device; and in response to a determination that the first wireless device and the second wireless device are located in a same indoor environment, modify the indoor map to include a second reference to the second reflector.

Aspect 6: The apparatus according to aspect 5, wherein the second wireless device is a Wi-Fi access point, and wherein the first wireless device is not associated with the Wi-Fi access point.

Aspect 7: The apparatus according to any one of aspects 1 to 6, wherein the at least one processor is configured to: receive a plurality of RF sensing data sets corresponding to the plurality of wireless devices, wherein the plurality of RF sensing data sets are associated with a plurality of received waveforms that are reflections of at least one transmitted waveform off of the first reflector; determine a plurality of position measurements associated with the first reflector based on the plurality of RF sensing data sets; and determine a location of the first reflector based on the plurality of position measurements.

Aspect 8: The apparatus according to aspect 7, wherein the at least one processor is configured to: determine that the first reflector corresponds to a transient object based on the plurality of RF sensing data sets corresponding to the plurality of wireless devices; and modify the indoor map to remove the reference to the first reflector.

Aspect 9: The apparatus according to any one of aspect 7 to 8, wherein the at least one processor is configured to: determine that the first reflector corresponds to a structural element based on the plurality of RF sensing data sets corresponding to the plurality of wireless devices, wherein the reference to the first reflector indicates a type of the structural element.

Aspect 10: The apparatus according to aspect 9, wherein the type of the structural element comprises at least one of a door, a window, a wall, a floor, a ceiling, a roof, a column, or a combination thereof.

Aspect 11: The apparatus according to any one of aspects 7 to 10, wherein the at least one processor is configured to: determine that the first reflector corresponds to a static object based on the plurality of RF sensing data sets, wherein the reference to the first reflector indicates a type of the static object.

Aspect 12: The apparatus according to aspect 11, wherein the type of the static object comprises at least one of a piece of furniture, an appliance, a fixture, or a combination thereof.

Aspect 13: The apparatus according to any one of aspects 1 to 12, wherein the transmitted waveform comprises at least one of a Wi-Fi signal, a New Radio (NR) signal, a RADAR signal, an Ultra-wideband (UWB) signal, or any combination thereof.

Aspect 14: The apparatus according to any one of aspects 1 to 13, wherein the first set of RF sensing data comprises channel state information (CSI) data.

Aspect 15: The apparatus according to aspect 14, wherein the location data is determined based on the CSI data.

Aspect 16: The apparatus according to any one of aspects 1 to 15, wherein the location data comprises a relative location inside of a building.

Aspect 17: The apparatus according to any one of aspects 1 to 16, wherein the orientation data is based on data obtained from a gyroscope on the wireless device, a compass on the wireless device, or any combination thereof.

Aspect 18: The apparatus according to any one of aspects 1 to 17, wherein the transmitted waveform is transmitted by an access point (e.g., a Wi-Fi access point).

Aspect 19: The apparatus according to any one of aspects 1 to 17, wherein the at least one processor is configured to: provide the indoor map to the first wireless device.

Aspect 20: The apparatus according to any one of aspects 1 to 19, wherein the first set of RF sensing data includes data associated with at least one received leakage waveform that corresponds to the transmitted waveform.

Aspect 21: A method of generating an indoor map, the method including operations according to any of aspects 1 to 20.

Aspect 22: A computer-readable medium comprising at least one instruction for causing a computer or processor to perform operations according to any of aspects 1 to 20.

Aspect 23: An apparatus for indoor mapping, the apparatus including means for performing operations according to any of aspects 1 to 20.

Aspect 24: An apparatus for indoor mapping. The apparatus includes at least one memory, at least one transceiver, and at least one processor coupled to the at least one memory and the at least one transceiver. The at least one processor is configured to: transmit, via the at least one transceiver, a radio frequency (RF) signal; receive, via the at least one transceiver, a plurality of reflected RF signals that are each a reflection of the transmitted RF signal from at least one object in an indoor space; obtain RF sensing data for the plurality of reflected RF signals from the at least one object; and present the indoor map for the indoor space that includes a reference to the at least one object, wherein the reference to the at least one object is based on the RF sensing data.

Aspect 25: The apparatus according to aspect 24, wherein the at least one processor is configured to: send, to a server device, the RF sensing data, device location data, and device orientation data.

Aspect 26: The apparatus according to aspect 25, wherein the at least one processor is configured to: receive, from the server device, the indoor map for the indoor space that includes the reference to the at least one object.

Aspect 27: The apparatus according to any one of aspects 24 to 27, wherein the at least one processor is configured to: calculate, based on the RF sensing data, device location data, and device orientation data, a distance and an angle of arrival between the wireless device and the at least one object.

Aspect 28: The apparatus according to aspect 27, wherein the device location data is based on the RF sensing data.

Aspect 29: The apparatus according to any one of aspects 24 to 29, wherein the at least one processor is configured to: download, from a server device, a partial indoor map for the indoor space; and modify the partial indoor map for the indoor space to include the reference to the at least one object.

Aspect 30: The apparatus according to aspect 29, wherein the at least one processor is configured to: send, to the server device, the modified indoor map that includes the reference to the at least one object.

Aspect 31: The apparatus according to any one of aspects 24 to 30, wherein the RF signal comprises at least one of a Wi-Fi signal, a New Radio (NR) signal, a RADAR signal, an Ultra-wideband (UWB) signal, or any combination thereof.

Aspect 32: The apparatus according to any one of aspects 24 to 31, wherein the RF sensing data comprises channel state information (CSI) data.

Aspect 33: A method of generating an indoor map, the method including operations according to any of aspects 24 to 32.

Aspect 34: A computer-readable medium comprising at least one instruction for causing a computer or processor to perform operations according to any of aspects 24 to 32.

Aspect 35: An apparatus for indoor mapping, the apparatus including means for performing operations according to any of aspects 24 to 32.

What is claimed is:

1. An apparatus for indoor mapping, comprising:
at least one memory;
at least one transceiver; and
at least one processor coupled to the at least one memory and the at least one transceiver, the at least one processor configured to:
transmit, via the at least one transceiver, a radio frequency (RF) signal;
receive, via the at least one transceiver, a plurality of reflected RF signals that are each a reflection of the transmitted RF signal from at least one object in an indoor space;
obtain RF sensing data for the plurality of reflected RF signals from the at least one object; and
present an indoor map for the indoor space that includes a reference to the at least one object, wherein the reference to the at least one object is based on the RF sensing data.

2. The apparatus of claim 1, wherein the at least one processor is configured to:
transmit, via the at least one transceiver to a server device, the RF sensing data, device location data, and device orientation data.

3. The apparatus of claim 2, wherein the at least one processor is configured to:
receive, from the server device, the indoor map for the indoor space that includes the reference to the at least one object.

4. The apparatus of claim 1, wherein the at least one processor is configured to:
calculate, based on the RF sensing data, device location data, and device orientation data, a distance and an angle of arrival between the apparatus and the at least one object.

5. The apparatus of claim 4, wherein the device location data is based on the RF sensing data.

6. The apparatus of claim 1, wherein the at least one processor is configured to:
download, from a server device, a partial indoor map for the indoor space; and
modify the partial indoor map for the indoor space to include the reference to the at least one object.

7. The apparatus of claim 6, wherein the at least one processor is configured to:
transmit, via the at least one transceiver to the server device, the modified partial indoor map that includes the reference to the at least one object.

8. The apparatus of claim 1, wherein the RF signal comprises at least one of a Wi-Fi signal, a New Radio (NR) signal, a RADAR signal, an Ultra-wideband (UWB) signal, or any combination thereof.

9. The apparatus of claim 1, wherein the RF sensing data comprises channel state information (CSI) data.

10. A method of indoor mapping performed at a wireless device, comprising:
transmitting a radio frequency (RF) signal;
receiving a plurality of reflected RF signals that are each a reflection of the transmitted RF signal from at least one object in an indoor space;
obtaining RF sensing data for the plurality of reflected RF signals from the at least one object; and
presenting an indoor map for the indoor space that includes a reference to the at least one object, wherein the reference to the at least one object is based on the RF sensing data.

11. The method of claim 10, further comprising:
transmitting, to a server device, the RF sensing data, device location data, and device orientation data.

12. The method of claim 11, further comprising:
receiving, from the server device, the indoor map for the indoor space that includes the reference to the at least one object.

13. The method of claim 10, further comprising:
calculating, based on the RF sensing data, device location data, and device orientation data, a distance and an angle of arrival between the wireless device and the at least one object.

14. The method of claim 13, wherein the device location data is based on the RF sensing data.

15. The method of claim 10, further comprising:
downloading, from a server device, a partial indoor map for the indoor space; and
modifying the partial indoor map for the indoor space to include the reference to the at least one object.

16. The method of claim 15, further comprising:
transmitting, to the server device, the modified partial indoor map that includes the reference to the at least one object.

17. The method of claim 10, wherein the RF signal comprises at least one of a Wi-Fi signal, a New Radio (NR) signal, a RADAR signal, an Ultra-wideband (UWB) signal, or any combination thereof.

18. The method of claim 10, wherein the RF sensing data comprises channel state information (CSI) data.

19. A non-transitory computer-readable medium of a wireless device comprising at least one instruction for causing a computer or processor to:
transmit, via at least one transceiver, a radio frequency (RF) signal;
receive, via the at least one transceiver, a plurality of reflected RF signals that are each a reflection of the transmitted RF signal from at least one object in an indoor space;
obtain RF sensing data for the plurality of reflected RF signals from the at least one object; and
present an indoor map for the indoor space that includes a reference to the at least one object, wherein the reference to the at least one object is based on the RF sensing data.

20. The non-transitory computer-readable medium of claim 19, further comprising at least one instruction for causing the computer or processor to:
transmit, via the at least one transceiver to a server device, the RF sensing data, device location data, and device orientation data.

21. The non-transitory computer-readable medium of claim 20, further comprising at least one instruction for causing the computer or processor to:
receive, from the server device, the indoor map for the indoor space that includes the reference to the at least one object.

22. The non-transitory computer-readable medium of claim 19, further comprising at least one instruction for causing the computer or processor to:
calculate, based on the RF sensing data, device location data, and device orientation data, a distance and an angle of arrival between the wireless device and the at least one object.

23. The non-transitory computer-readable medium of claim 22, wherein the device location data is based on the RF sensing data.

24. The non-transitory computer-readable medium of claim 19, further comprising at least one instruction for causing the computer or processor to:

> download, from a server device, a partial indoor map for the indoor space; and
>
> modify the partial indoor map for the indoor space to include the reference to the at least one object.

25. The non-transitory computer-readable medium of claim 24, further comprising at least one instruction for causing the computer or processor to:

> transmit, via the at least one transceiver to the server device, the modified partial indoor map that includes the reference to the at least one object.

26. The non-transitory computer-readable medium of claim 19, wherein the RF signal comprises at least one of a Wi-Fi signal, a New Radio (NR) signal, a RADAR signal, an Ultra-wideband (UWB) signal, or any combination thereof.

27. The non-transitory computer-readable medium of claim 19, wherein the RF sensing data comprises channel state information (CSI) data.

28. An apparatus for indoor mapping, comprising:

> means for transmitting a radio frequency (RF) signal;
>
> means for receiving a plurality of reflected RF signals that are each a reflection of the transmitted RF signal from at least one object in an indoor space;
>
> means for obtaining RF sensing data for the plurality of reflected RF signals from the at least one object; and
>
> means for presenting an indoor map for the indoor space that includes a reference to the at least one object, wherein the reference to the at least one object is based on the RF sensing data.

29. The apparatus of claim 28, wherein the means for transmitting is configured to:

> transmit, to a server device, the RF sensing data, device location data, and device orientation data.

30. The apparatus of claim 29, wherein the means for receiving is configured to:

> receive, from the server device, the indoor map for the indoor space that includes the reference to the at least one object.

\* \* \* \* \*